[11] 3,571,567

| [72] | Inventor | Alfred E. Eckermann |
| | | Littleton, Colo. |
| [21] | Appl No | 889,866 |
| [22] | Filed | Dec. 19, 1969 |
| [45] | Patented | Mar. 23, 1971 |
| [73] | Assignee | The Bendix Corporation |

[54] APPARATUS WHICH DETERMINES LATITUDE AND LONGITUDE FROM THE DERIVATIVES OF TWO COORDINATES OF A STAR
14 Claims, 5 Drawing Figs.

[52] U.S. Cl. ............ 364/460, 455, ~~235/150.271~~,
33/61, 250/203 CT
[51] Int. Cl. ........................................... G01c 17/34,
G01j 1/20, G06f 15/50
[50] Field of Search ........................... 235/150.27,
150.271; 33/61; 250/203

[56] References Cited
UNITED STATES PATENTS
3,194,949  7/1965  Jasperson ..................... 33/61X Primary Examiner—James W. Lawrence
Assistant Examiner—T. N. Grigsby
Attorneys—Ronald G. Gillespie and Plante, Hartz, Smith and Thompson ABSTRACT: An astronavigational system comprising a telescope which is automatically controlled to periodically track a star. A pulse source periodically activates switching means which control servo circuits that drive the telescope through a change in the zenith angle and a change in the azimuth angle of the star, which has moved between trackings, until an image of the star is aligned with the center of the photosurface of an image-dissector tube. A zenith-angle-measuring circuit provides signals corresponding to the average zenith angle and the change in zenith angle for the time period between trackings of the star. An azimuth-angle-measuring circuit provides a signal corresponding to the change in azimuth angle for the time period. A computer uses the signals from the measuring circuits and a time-base signal from the pulse source to compute longitude and latitude.

INVENTOR.
ALFRED E. ECKERMANN

APPARATUS WHICH DETERMINES LATIDUDE AND LONGITUDE FROM THE DERIVATIVES OF TWO COORDINATES OF A STAR

BACKGROUND OF THE INVENTION

1. Field of the Invention

The present invention relates to a navigational system and, more particularly, to a navigational system using a celestial body as a reference.

2. Description of the Prior Art

Heretofore, navigational systems of the type disclosed in U.S. application Ser. No. 874,095, filed on Nov. 3, 1969 by Alfred E. Eckermann, inventor of the present invention, and assigned to The Bendix Corporation, assignee of the present invention provided a shadow in response to light from a celestial body and measures the movement of the shadow, as the celestial body moves relative to earth, to determine the longitude and latitude. The present invention differs by periodically tracking the celestial body and the change in the zenith and azimuth angles of the celestial body is measured to determine longitude and latitude. The present invention is able to track celestial bodies that do not provide sufficient light to create shadows.

SUMMARY OF THE INVENTION

A navigational system responsive to light from a celestial body for providing outputs corresponding to longitude and latitude, comprising a telescope arranged to transmit an image of the celestial body with the telescope being driven so as to track the celestial body. A measuring circuit arranged with the telescope measures the zenith angle and the azimuth angle of the celestial body and provides measurement signals. Signal means connected to the measuring circuit provides signals corresponding to the rate of change of the azimuth angle and to the rate of change of the zenith angle in accordance with the signals from the measuring circuit. Output means connected to the signal provides the outputs corresponding to the longitude and latitude in accordance with the signals from the signal means.

One object of the present invention is to periodically track a celestial body to determine longitude and latitude.

Another object of the present invention is to periodically track a celestial body so that the rate of change of the zenith and azimuth angles of the celestial body may be measured.

Another object of the present invention is to initially align a telescope with a star, and after a suitable time has elapsed realign the telescope with the star so that the movement of the telescope corresponds to the relative movement of the star during that time period.

The foregoing and other objects and advantages of the invention will appear more fully hereinafter from a consideration of the detailed description which follows, taken together with the accompanying drawings wherein one embodiment of the invention is illustrated by way of example. It is to be expressly understood, however, that the drawings are for illustration purposes only and are not to be construed as defining the limits of the invention.

DESCRIPTION OF THE INVENTION

Figure 1:
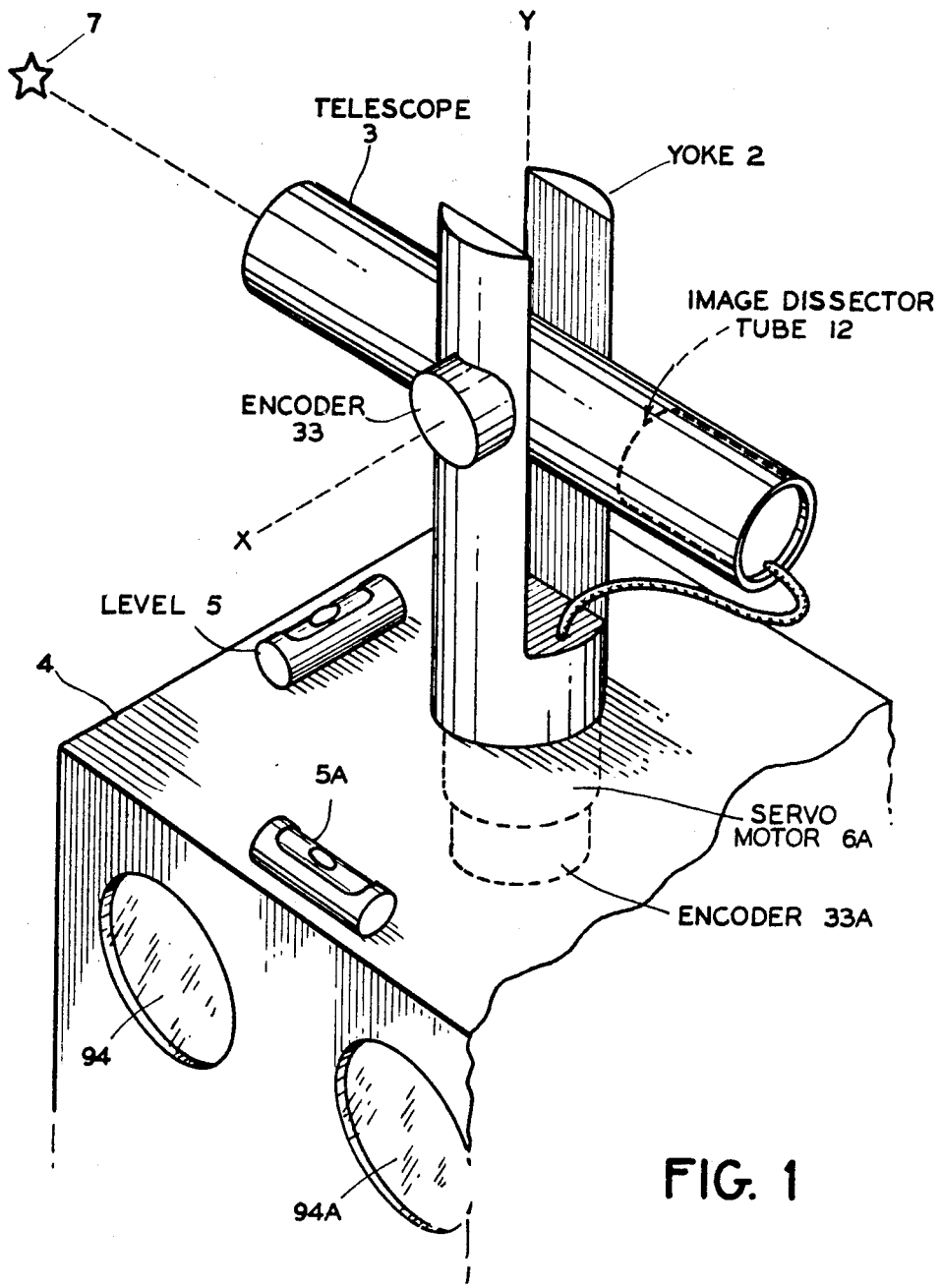
FIGS. 1 and 2 show an optical section and a block diagram of an electronic section of a celestial navigational system constructed in accordance with the present invention.

Referring to FIG. 1, there is shown the optical section of a celestial navigational system in which a telescope 3 in a yoke 2 is mounted on a surface 4 that is parallel to the surface of the earth as indicated by levels 5 and 5A. Telescope 3 is rotatable about the X-axis, while telescope 3 and yoke 2 are rotatable about the Y-axis as shown in FIG. 1. Telescope 3 is automatically controlled by servomotors 6 (not shown), 6A to periodically track a star 7, such as Canopus or any other star having a known Right Ascension, to provide information relating to the average zenith angle and the rate of change of the zenith angle and the rate of change of an azimuth angle of star 7. Light from star 7 enters telescope 3 and is focused so that an image of star 7 impinges upon a photocathode surface 10 of an image-dissector tube 12 contained in telescope 3.

Figure 2:
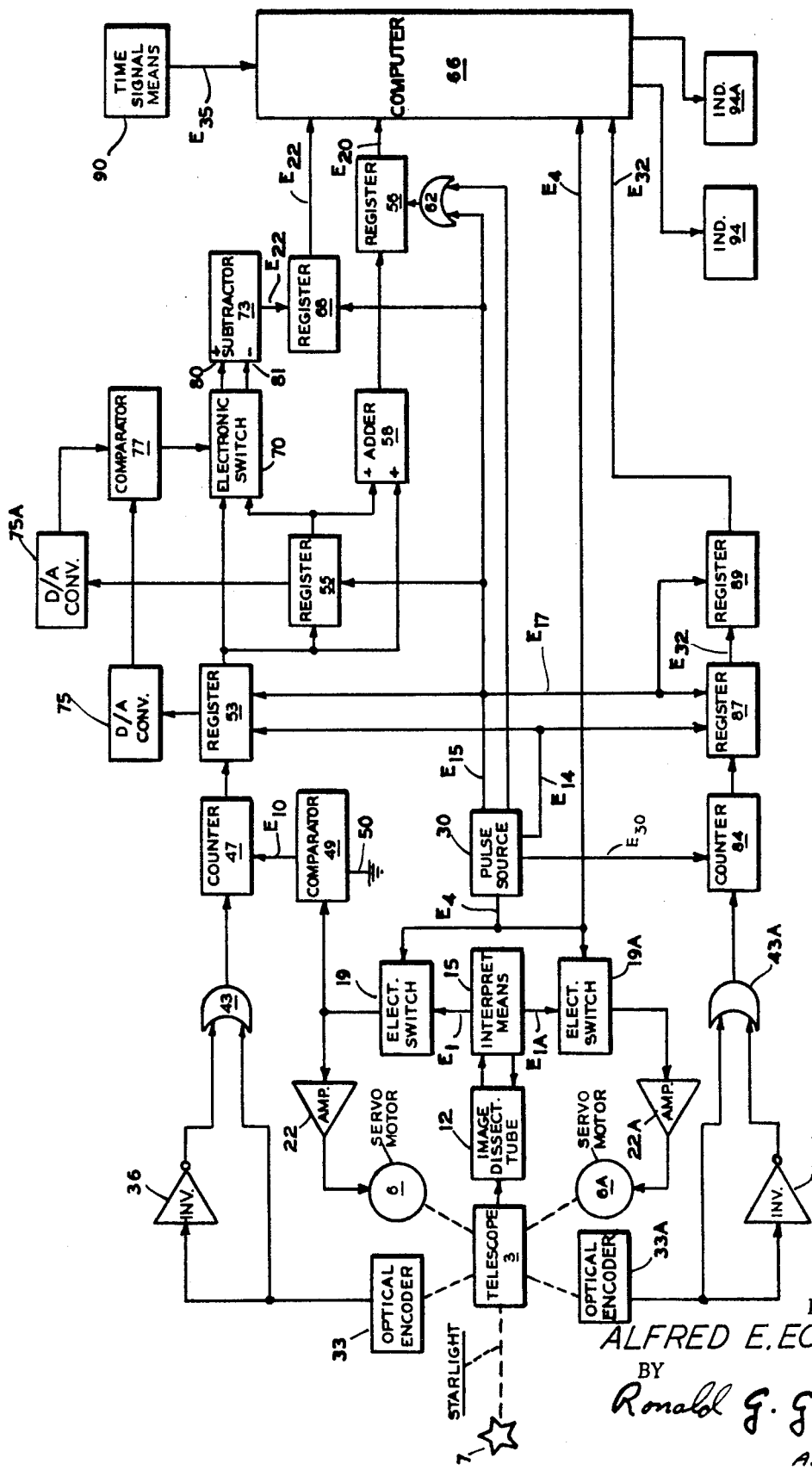
Figure 3:
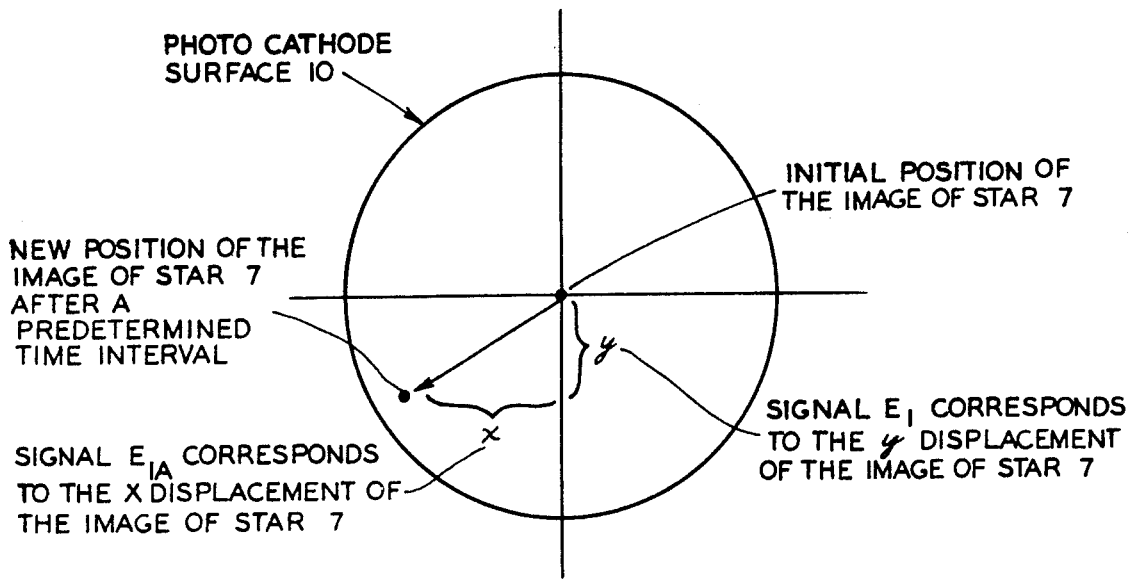
FIG. 3 shows the displacement of the image of the star on the photocathode surface of the image-dissector tube shown in FIGS. 1 and 2.

Referring to FIGS. 1, 2 and 3, image-dissector tube 12 provides an output corresponding to the displacement of the star image from the center of the surface 10 of image-dissector tube 12. Interpreting means 15, which may be of the type disclosed in U. S. Pat. No. 3,240,942, control the scan of image-dissector tube 12 and provides outputs $E_1$ and $E_{14}$ in response to the output from image-dissector tube 12 and corresponding to the vertical and horizontal displacement, respectively, of the image of star 7 from the center of surface 10 of image-dissector tube 12, as shown in FIG. 3. Initially telescope 3 is adjusted so that the image of star 7 is located at the center of surface 10. Telescope 3 is then prevented from tracking star 7 as it moves relative to the earth for a predetermined time interval. Telescope 3 is then controlled to realign the image of star 7 with the center of surface 10 so that telescope 3 has moved through a change in the zenith angle and azimuth angle of star 7 for the predetermined time interval.

The circuitry for periodically holding telescope 3 and then driving telescope 3 through the zenith angle includes servomotor 6, an electronic switch 19, and an amplifier 22. Motor 6 is mechanically connected to telescope 3 and rotates it through the zenith angle of star 7 in response to signal $E_1$ applied through switch 19 and amplifier 22. Switch 19 is controlled by a pulse train $E_4$, shown in FIG. 4A, from a pulse source 30. The time interval between pulses in pulse train in $E_4$ should be of a suitable duration to permit a detectable movement of star 7 while the pulses should be of suitable width to allow telescope 3 to be realigned with star 7.

In computing the longitude and latitude, it is necessary that the average zenith angle for a predetermined time period and the rate of change of the zenith angle be measured. The zenith-angle-measuring circuit includes an optical encoder 33, an inverter 36, an OR gate 43, a conventional-type up-down counter 47 and a comparator 49. As telescope 3 is driven to its new position, encoder 33 provides a pulse train output. Each pulse in the pulse train from encoder 33 corresponds to an angular measurement and each interval between pulses corresponds to another angular measurement. The pulse train from encoder 33 is applied to counter 47 through OR gate 43 and to inverter 36. Inverter 36 provides an inverted pulse train to counter 47 so that counter 47 may also count the interval between pulses. The count in counter 47 corresponds to the zenith angle of star 7. Comparator 49, connected to a ground 50, compares signal $E_1$ with ground reference and provides a signal $E_{10}$ when the amplitude of signal $E_1$ is greater than zero. Signal $E_{10}$ controls the counting direction of counter 47 as determined by the direction that telescope 3 is moving.

Figure 4:
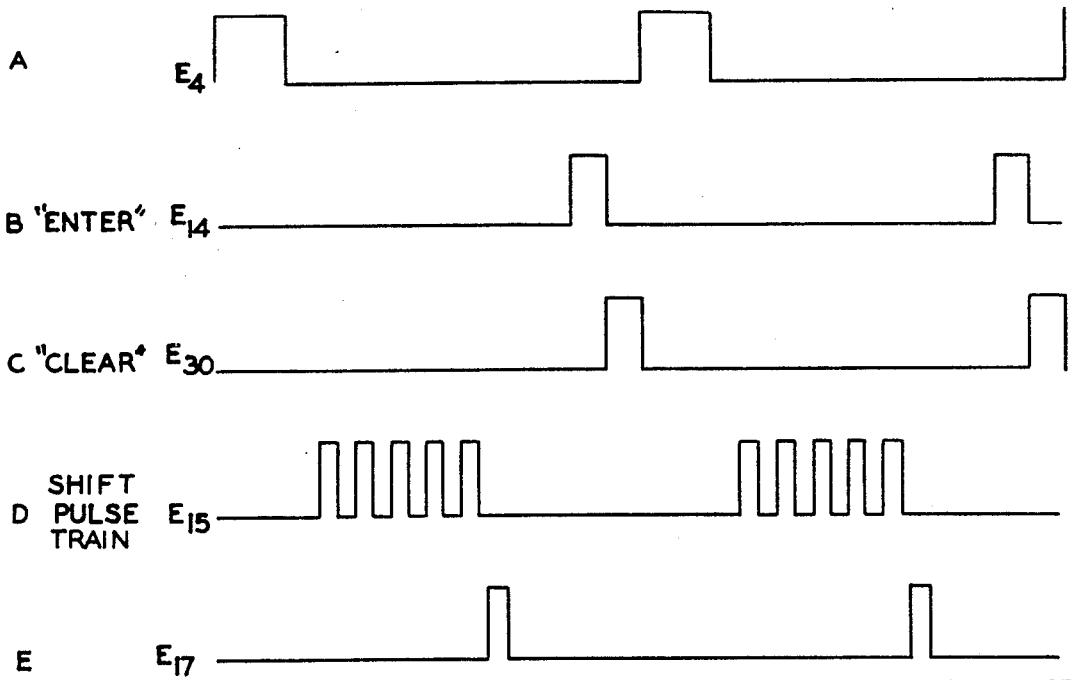
FIG. 4 is a diagrammatic representation of signals occurring during operation of the electronic section shown in FIG. 2.

The average zenith angle is determined by registers 53, 55, and 56, and a conventional-type adder 58. The count from counter 47 is entered in register 53 on a periodic basis in response to an 'enter' pulse train $E_{14}$, shown in FIG. 4B, from source 30. Source 30 then provides a shift pulse train $E_{15}$, shown in FIG. 4C, to shift the count from register 53 to register 55, so that during operation of the astronavigational system registers 53, 55 always contain successive counts. After the next count which is entered into register 53, the next shift pulse train $E_{15}$ shifts the successive counts from registers 53, 55 through adder 58 which provides a signal corresponding to the sum to register 56. At the end of each shift pulse train, source 30 provides a pulse $E_{17}$, as shown in FIG. 4E, to register 56 through an OR gate 62 to effectively divide the sum in register 56 by 2 so that the content of register 56 is the average zenith angle for the predetermined time period between successive counts. Register 56 provides an average zenith angle signal $E_{20}$ to a computer 66.

The circuitry for determining the rate of change of the zenith angle includes registers 53, 55 and 68, an electronic switch 70 and a subtractor 73. While registers 53, 55 are providing their contents to adder 58, their contents are also applied to subtractor 73 through switch 70. Subtractor 73 provides a signal $E_{22}$ corresponding to the difference between the zenith angles to register 68. Register 68 provides a time delay so that the signals $E_{20}$ and $E_{22}$ corresponding to the same time interval arrive at computer 66 simultaneously.

Digital to analogue converters 75, 75A and a conventional-type comparator 77 control electronic switch 70 so that a smaller count is always subtracted from a larger count. Converters 75, 75A provide analogue signals corresponding to the contents of registers 53 and 55, respectively, to comparator 77 which compares the signals and provides an output to switch 70 when the content of register 55 has a greater value than the content of register 53. Switch 70 passes the contents of registers 53, 55 to inputs 80 and 81, respectively, of subtractor 73 when comparator 77 provides no output. Subtractor 73 subtracts the content applied to input 81 from the content applied to input 80. Switch 70 passes the contents of registers 53, 55 to inputs 81 and 80, respectively, of subtractor 73 when comparator 77 provides an output to switch 70.

The circuitry for measuring the rate of change of the azimuth angle of star 7 is similar to the circuitry heretofore described for measuring the rate of change of the zenith angle of star 7. Elements having a number with a suffix A are connected and operate in the same manner as elements having the same number without a suffix.

A counter 8, which may be of a conventional type, counts timing pulses $E_8$ and is cleared by a clear pulse train $E_{30}$. Since only the rate of change of the azimuth angle is needed, counter 84 is not an up-down counter and each count in counter 84 corresponds to a change in the azimuth angle. Registers 87, 89 are used as a storage register and a time delay register, respectively. The count from counter 84 enters register 87 in response to 'enter' pulse train $E_{14}$ applied to register 87. 'Shift' pulse train $E_{15}$ shifts the content of register 87 to register 89 which provides the change in azimuth signal $E_{32}$. It should be noted that since there are three registers 53, 55, 58, or 53, 55, 68 in the signal path between counter 47 and computer 66, register 89 should have twice the number of stages than register 55 has in order to provide the correct time delay.

Pulse source 30 also provides pulse train $E_4$ to computer 66 as a time-base signal so that computer 66 can compute the rate of change of the zenith angle from signals $E_4$, $E_{22}$ and the rate of change of the azimuth angle from signals $E_4$, $E_{32}$. Computer 66 provides signals corresponding to the longitude and latitude to indicators 94, 94A.

Computer 66 computes the longitude and latitude in accordance with the following equations:

$$\frac{d\psi}{dt} = \frac{(\sin\lambda - \cos\lambda \cos\phi \tan\delta)\omega}{(\cos\phi \sin\lambda - \cos\lambda \tan\delta)^2 + \sin^2\phi} \quad (1)$$

$$\cos\nu = \cos\lambda \cos\phi \cos\delta + \sin\lambda \sin\delta \quad (2)$$

$$\frac{d\nu}{dt} = \frac{\omega \sin\phi \cos\delta \cos\lambda}{\sin\nu} \quad (3)$$

and $$\text{East Longitude} = \text{R.A.} - \text{G.S.T.} + \phi \quad (4)$$

where $\lambda$ is the latitude angle, $\Phi$ is the hour angle, $\delta$ is the angle of declination of the observed star, $\psi$ is the azimuth angle to the meridian measured in the local horizontal plane, $\nu$ is the zenith angle of the star, $\omega$ is the angular rotation of the earth about its polar axis, R.A. is the Right Ascension of the star and G.S.T. is Greenwich Sidereal Time.

The right ascensions R.A. of stars having known angles of inclination may be stored in a memory section of computer 66. Computer 66 computes the declination angle $\delta$ of star 7 in accordance with equation 85, hereinafter disclosed, and computer 66 uses the declination angle $\delta$ to select the correct right ascension R.A. for star 7 from its memory section which is used in solving equation 4.

DERIVATION OF EQUATIONS 1 and 2

Figure 5:
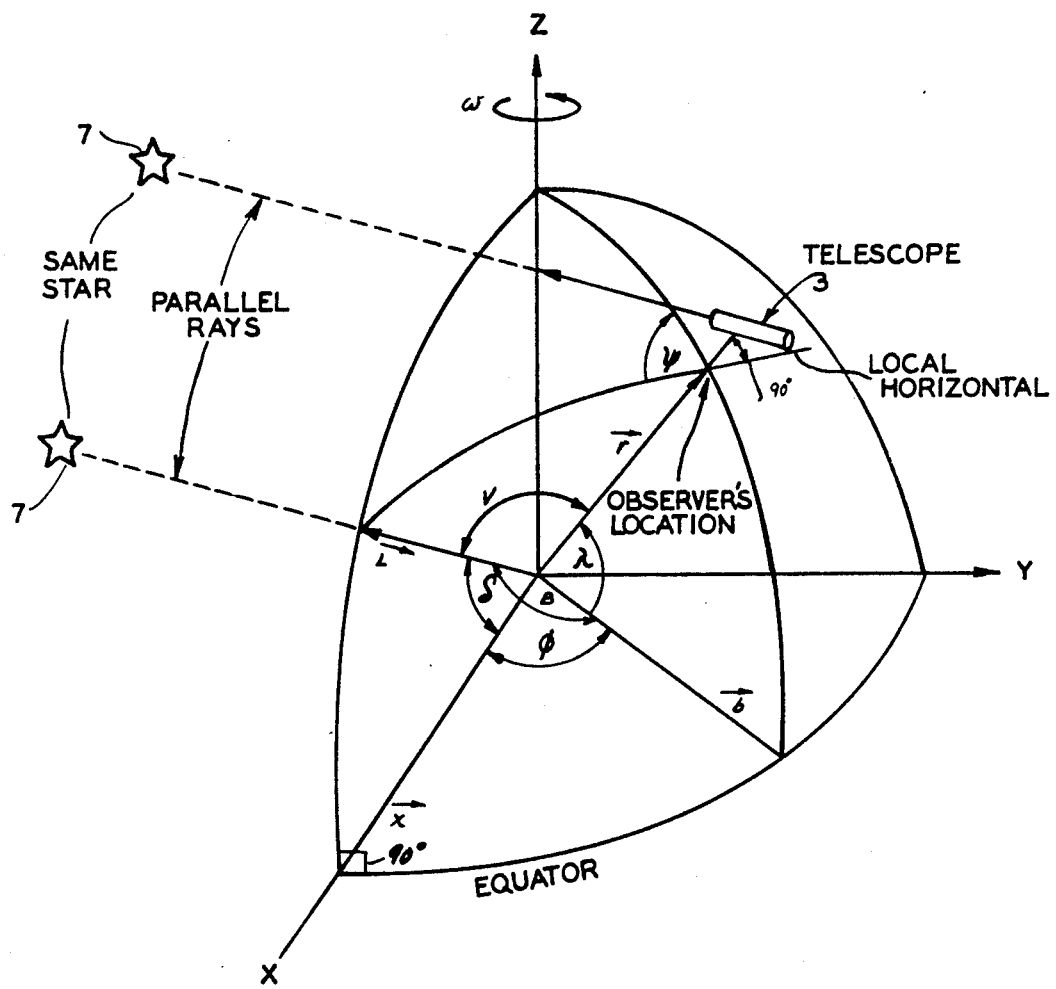
FIG. 5 shows the relationship of the telescope shown in FIGS. 1 and 2 to the star and the earth's coordinate system.

Referring to FIG. 5, the law of sines is used with triangle $(\vec{i}, \vec{r}, \vec{z})$ to obtain $$\frac{\sin(180-\psi)}{\sin(90-\delta)} = \frac{\sin\phi}{\sin\nu} \quad (5)$$

However, $$\sin(90-\delta) = \cos\delta \quad (6)$$

and $$\sin(180-\psi) = \sin\psi \quad (7)$$

therefore $$\frac{\sin\psi}{\cos\delta} = \frac{\sin\phi}{\sin\nu} \quad (8)$$

or $$\sin\nu = \frac{\sin\phi \cos\delta}{\sin\psi} \quad (9)$$

The following vector equations are also obtained from FIG. 5.

$$(\vec{r} \times \vec{i}) \cdot (\vec{r} \times \vec{b}) = (\vec{r} \cdot \vec{r})(\vec{i} \cdot \vec{b}) - (\vec{r} \cdot \vec{b})(\vec{i} \cdot \vec{r}) \quad 10,$$

Where $$\vec{r} \times \vec{i} = \sin\nu \quad 11,$$

$$\vec{r} \times \vec{b} = \sin\lambda \quad 12,$$

$$(\vec{r} \times \vec{i}) \cdot (\vec{r} \times \vec{b}) = \sin\nu \cos\psi \sin\lambda \quad 13,$$

$$\vec{r} \cdot \vec{r} = 1 \quad 14,$$

$$\vec{i} \cdot \vec{b} = \cos\beta \quad 15,$$

$$\vec{r} \cdot \vec{b} = \cos\lambda \quad 16,$$

and $$\vec{i} \cdot \vec{r} = \cos\nu \quad 17.$$

Substituting equations 13 through 17 into equation 10 and rewriting equation 10 as $$\sin\nu \cos\psi \sin\lambda = (1)\cos\beta - \cos\lambda \cos\nu \quad 18.$$

Writing another vector equation from FIG. 5

$$(\vec{x} \times \vec{i}) \cdot (\vec{x} \times \vec{b}) = (x \cdot x)(i \cdot b) - (x \cdot b)(i \cdot x) \quad 19,$$

where $$\vec{x} \times \vec{i} = \sin \delta \quad 20,$$

$$\vec{x} \times \vec{b} = \sin \Phi \quad 21,$$

$$(\vec{x} \times \vec{i}) \cdot (\vec{x} \times \vec{b}) = \sin \delta \cos 90° \sin \Phi = 0 \quad 22,$$

$$\vec{x} \cdot \vec{x} = 1 \quad 23,$$

$$\vec{i} \cdot \vec{b} = \cos \beta \quad 24,$$

$$\vec{x} \cdot \vec{b} = \cos \Phi \quad 25,$$

and $$\vec{i} \cdot \vec{x} = -\cos \delta \quad 26.$$

Substituting equations 21 through 25 into equation 19, equation 19 is written as $$0 = \cos \beta - \cos \Phi \cos \delta \quad 27,$$

or $$\cos \beta = \cos \Phi \cos \delta \quad 28,$$

or $$\cos \delta = \frac{\cos \beta}{\cos \phi} \quad (29)$$

The following vector equation is also from FIG. 5

$$(\vec{z} \times \vec{i}) \cdot (\vec{z} \times \vec{r}) = (\vec{z} \cdot \vec{z})(\vec{i} \cdot \vec{r}) - (\vec{z} \cdot \vec{r})(\vec{i} \cdot \vec{z}) \quad 30,$$

where $$\vec{z} \times \vec{i} = \sin(90-\delta) = \cos \delta \quad 31,$$

$$\vec{z} \times \vec{r} = \sin(90-\lambda) = \cos \lambda \quad 32,$$

$$(\vec{z} \times \vec{i}) \cdot (\vec{z} \times \vec{r}) = \cos \delta \cos \Phi \cos \lambda \quad 33,$$

$$\vec{z} \cdot \vec{z} = 1 \quad 34,$$

$$\vec{i} \cdot \vec{r} = \cos \nu \quad 35,$$

$$\vec{z} \cdot \vec{r} = \cos(90-\lambda) = \sin \lambda \quad 36,$$

and $$\vec{i} \cdot \vec{z} = \cos(90-\delta) = \sin \delta \quad 37.$$

Substituting equations 33 through 37 into equation 30, equation 30 may be rewritten as:

$$\cos \delta \cos \Phi \cos \lambda = \cos \nu - \sin \lambda \sin \delta \quad 38,$$

or $$\cos \nu = \cos \delta \cos \Phi \cos \lambda + \sin \lambda \sin \delta \quad 39,$$

which is equation 2.

Equation 17 is solved for $\psi$ by eliminating $\nu$ and $\beta$.

Substituting for $\sin \nu$, $\cos \beta$ and $\cos \nu$ from equations 9, 28 and 39, respectively, equation 17 is now rewritten as $$\sin \nu \cos \psi \sin \lambda = \cos \beta - \cos \lambda \cos \nu \quad 40,$$

or $$\frac{\sin \phi \cos \delta}{\sin \psi} \cos \psi \sin \lambda = \cos \phi \cos \delta$$
$$- \cos \lambda [\cos \delta \cos \phi \cos \lambda + \sin \lambda \sin \delta] \quad (41)$$

or $$\frac{\sin \phi \cos \delta \sin \lambda}{\cos \phi \cos \delta - \cos \delta \cos \phi \cos^2 \lambda - \cos \lambda \sin \lambda \sin \delta} = \tan \psi \quad (42)$$

Multiplying the right side of equation 42 by $$\frac{\frac{1}{\cos \delta}}{\frac{1}{\cos \delta}}$$

equation 42 yields $$\tan \psi = \frac{\sin \phi \sin \lambda}{\cos \phi - \cos \phi \cos^2 \lambda - \cos \lambda \tan \delta \sin \lambda} \quad (43)$$

which is further simplified to $$\tan \psi = \frac{\sin \phi \sin \lambda}{\cos \phi \sin^2 \lambda - \sin \lambda \cos \lambda \tan \delta} \quad (44)$$

finally as $$\tan \psi = \frac{\sin \phi}{\cos \phi \sin \lambda - \cos \lambda \tan \delta} \quad (45)$$

Equation 45 is similar to equation 1 of the aforementioned Eckermann application Ser. No. 874,095 in form, except for the negative sign in the denominator. Therefore the derivative of equation 45 may be written, by way of analogy to equation 2 of the Eckermann application, as $$\frac{d\psi}{dt} = \frac{(\sin \lambda - \cos \lambda \cos \phi \tan \delta)\omega - \cos \lambda \sin \phi \sec^2 \delta \frac{d\delta}{dt}}{(\cos \phi \sin \lambda - \cos \lambda \tan \delta)^2 + \sin^2 \phi} \quad (46)$$

However, the angle $\delta$ is constant and therefore $d\delta/dt = 0$, so that equation 46 reduces to $$\frac{d\psi}{dt} = \frac{(\sin \lambda - \cos \lambda \cos \phi \tan \delta)\omega}{(\cos \phi \sin \lambda - \cos \lambda \tan \delta)^2 + \sin^2 \phi} \quad (47)$$

which is the same as equation 1.

Taking the derivative of equation 2 or 39 with respect to time $$-\sin \mu \frac{d\mu}{dt} = -\cos \delta \sin \phi \cos \lambda \frac{d\phi}{dt} \quad (48)$$

but $\frac{d\phi}{dt} = \omega$, therefore $$\frac{d\nu}{dt} = \frac{\omega \cos \delta \sin \phi \cos \lambda}{\sin \nu} \quad (49)$$

which is the same as equation 3.

Equation 39 may be rewritten as $$\cos \phi = \frac{\cos \nu - \sin \lambda \sin \delta}{\cos \lambda \cos \delta} \quad (50)$$

Squaring both sides, equation 50 is written as $$\cos^2 \phi = \frac{(\cos \nu - \sin \lambda \sin \delta)^2}{\cos^2 \lambda \cos^2 \delta} \quad (51)$$

It follows that equation 51 may be written as $$\sin^2 \phi = 1 - \cos^2 \phi = 1 - \frac{(\cos \nu - \sin \lambda \sin \delta)^2}{\cos^2 \lambda \cos^2 \delta} \quad (52)$$

Substituting for $\cos \Phi$ and $\sin^2 \Phi$ from equations 50 and 52 in equation 47, equation 47 is written as $$\frac{d\psi}{dt} = \frac{\omega \left\{ \sin \lambda - \frac{(\cos \nu - \sin \lambda \sin \delta) \cos \lambda \tan \delta^2}{\cos \lambda \cos \delta} \right\}}{\frac{\cos^2 \lambda \cos^2 \delta - (\cos \nu - \sin \lambda \sin \delta)^2}{\cos^2 \lambda \cos^2 \delta}}$$
$$+ (\cos \phi \sin \lambda - \cos \lambda \tan \delta)^2 \quad (53)$$

Equation 52 is simplified as follows:

$$\frac{d\psi}{dt} = \frac{\omega \left\{ \frac{\sin \lambda \cos^2 \delta - (\cos \nu - \sin \lambda \sin \delta) \sin \delta}{\cos^2 \delta} \right\}}{\frac{\cos^2 \lambda \cos^2 \delta - (\cos \nu - \sin \lambda \sin \delta)^2}{\cos^2 \lambda \cos^2 \delta}}$$
$$+ \left\{ \frac{(\cos \nu - \sin \lambda \sin \delta) \sin \lambda}{\cos \lambda \cos \delta} - \cos \lambda \tan \delta \right\}^2 \quad (54)$$

$$\frac{d\psi}{dt} = \frac{\omega\left\{\sin\lambda\cos^2\delta - \frac{\cos\mu\sin\delta + \sin\lambda\sin^2\delta}{\cos^2\delta}\right\}}{\cos^2\lambda\cos^2\delta - (\cos\mu - \sin\lambda\sin\delta)^2 + \{\sin\lambda(\cos\mu - \sin\lambda\sin\delta) - \cos^2\lambda\cos\delta\tan\delta\}^2}{\cos^2\lambda\cos^2\delta}} \quad (55)$$

$$\frac{d\psi}{dt} = \frac{\omega\cos^2\lambda\{\sin\lambda\cos^2\delta - \cos\mu\sin\delta + \sin\lambda\sin^2\delta\}}{\{\cos^2\lambda\cos^2\delta - (\cos\mu - \sin\lambda\sin\delta)^2 + \sin^2\lambda(\cos\mu - \sin\lambda\sin\delta)^2 + \cos^4\lambda\sin^2\delta - 2\sin\lambda(\cos\mu - \sin\lambda\sin\delta)\sin\delta\cos^2\lambda\}} \quad (56)$$

$$\frac{d\psi}{dt} = \frac{\omega\cos^2\lambda\{\sin\lambda(\sin^2\delta + \cos^2\delta) - \cos\mu\sin\delta\}}{\{\cos^2\lambda\cos^2\delta - (\cos\mu - \sin\lambda\sin\delta)^2(1 - \sin^2\lambda) + \cos^4\lambda\sin^2\delta - 2\sin\lambda(\cos\mu - \sin\lambda\sin\delta)\sin\delta\cos^2\lambda\}} \quad (57)$$

$$\frac{d\psi}{dt} = \frac{\omega\{\sin\lambda - \cos\mu\sin\delta\}}{\{\cos^2\delta - (\cos\mu - \sin\lambda\sin\delta)^2 + \cos^2\lambda\sin^2\delta - 2\sin\lambda(\cos\mu - \sin\lambda\sin\delta)\sin\delta\}} \quad (58)$$

$$\frac{d\psi}{dt} = \frac{\omega\{\sin\lambda - \cos\mu\sin\delta\}}{\{\cos^2\delta - (\cos\mu - \sin\lambda\sin\delta)^2 + \sin^2\delta(1 - \sin^2\lambda) - 2\sin\lambda(\cos\mu - \sin\lambda\sin\delta)\sin\delta\}} \quad (59)$$

$$\frac{d\psi}{dt} = \frac{\omega(\sin\lambda - \cos\mu\sin\delta)}{\{\cos^2\delta + \sin^2\delta - \sin^2\delta\sin^2\lambda - \cos^2\mu + 2\cos\mu\sin\lambda\sin\delta - \sin^2\lambda\sin^2\delta + 2\sin^2\lambda\sin^2\delta - 2\cos\mu\sin\lambda\sin\delta\}} \quad (60)$$

$$\frac{d\psi}{dt} = \frac{\omega(\sin\lambda - \cos\mu\sin\delta)}{1 - \cos^2\mu} \quad (61)$$

$$\frac{d\psi}{dt} = \frac{\omega(\sin\lambda - \cos\mu\sin\delta)}{\sin^2\mu} \quad (62)$$

Differentiating equation 39, we have $$-\sin\nu\frac{d\nu}{dt} = \omega\cos\lambda\cos\delta\sin\phi \quad (63)$$

Solving for sin Φ, equation 63 is written as $$\sin\phi = \frac{\sin\nu\frac{d\nu}{dt}}{\omega\cos\lambda\cos\delta} \quad (64)$$

Squaring both sides, equation 64 is written as $$\sin^2\phi = \frac{\sin^2\nu\left(\frac{d\nu}{dt}\right)^2}{\omega^2\cos^2\lambda\cos^2\delta} \quad (65)$$

Substituting for sin2Φ from equation 52, equation 65 is written as $$1 - \frac{(\cos\nu - \sin\lambda\sin\delta)^2}{\cos^2\lambda\cos^2\delta} = \frac{\sin^2\nu\left(\frac{d\nu}{dt}\right)^2}{\omega^2\cos^2\lambda\cos^2\delta} \quad (66)$$

Equation 66 is simplified as follows $$\cos^2\lambda\cos^2\delta - (\cos\nu - \sin\lambda\sin\delta)^2 = \frac{1}{\omega^2}\sin^2\nu\left(\frac{d\nu}{dt}\right)^2 \quad (67)$$

$$\cos^2\lambda\cos^2\delta - \cos^2\nu - \sin^2\lambda\sin^2\delta + 2\cos\nu\sin\lambda\sin\delta = \frac{\sin^2\nu}{\omega^2}\left(\frac{d\nu}{dt}\right)^2 \quad (68)$$

$$(1-\sin^2\lambda)(1-\sin^2\delta) - \cos^2\nu - \sin^2\lambda\sin^2\delta + 2\cos\nu\sin\lambda\sin\delta = \frac{\sin^2\nu}{\omega^2}\left(\frac{d\nu}{dt}\right)^2 \quad (69)$$

$$1 - \sin^2\lambda - \sin^2\delta - \cos^2\nu + 2\cos\nu\sin\lambda\sin\delta = \frac{\sin^2\nu}{\omega^2}\left(\frac{d\nu}{dt}\right)^2 \quad (70)$$

and finally as $$\sin^2\lambda - 2\cos\nu\sin\lambda\sin\delta + \sin^2\delta + \frac{\sin^2\nu}{\omega^2}\left(\frac{d\nu}{dt}\right)^2 + \cos^2\nu - 1 = 0 \quad (71)$$

Using the quadratic equation $$aX^2 + bX + c0 \quad 72,$$

solving for $X$ $$X = \frac{-b \pm \sqrt{b^2 - 4ac}}{2a} \quad (73)$$

and letting $$a = 1 \quad (74)$$

$$b = -2\cos\nu\sin\lambda\sin\delta \quad (75)$$

and $$c = \left\{\sin^2\delta + \frac{\sin^2\nu}{\omega^2}\left(\frac{d\nu}{dt}\right)^2 + \cos^2\nu - 1\right\} \quad (76)$$

and $$x = \sin\lambda \quad (77)$$

equation 72 is written as $$\sin\lambda = \frac{+2\cos\nu\sin\delta \pm \left\{4\cos^2\nu\sin^2\delta - 4\left\{\sin^2\delta + \frac{\sin^2\nu}{\omega^2}\left(\frac{d\nu}{dt}\right)^2 + \cos^2\nu - 1\right\}\right\}^{\frac{1}{2}}}{2} \quad (78)$$

Equation 77 is simplified as follows $$\sin\lambda = \cos\nu\sin\delta \pm \left\{\cos^2\nu(1 - \cos^2\epsilon) - \sin^2\delta - \frac{\sin^2\nu}{\omega^2}\left(\frac{d\nu}{dt}\right)^2 - \cos^2\nu + 1\right\}^{\frac{1}{2}} \quad (79)$$

$$(\sin\lambda - \cos\nu\sin\delta)^2 = 1 - \sin^2\delta - \cos^2\nu\cos^2\delta - \frac{\sin^2\nu}{\omega^2}\left(\frac{d\nu}{dt}\right)^2 \quad (80)$$

and $$(\sin\lambda - \cos\nu\sin\delta)^2 = \cos^2\delta\sin^2\nu - \frac{\sin^2\nu}{\omega^2}\left(\frac{d\nu}{dt}\right)^2 \quad (81)$$

Equation 62 may be written as $$(\sin\lambda - \cos\nu\sin\delta)^2 = \frac{\sin^4\nu}{\omega^2}\left(\frac{d\psi}{dt}\right)^2 \quad (82)$$

Substituting for $(\sin\lambda - \cos\nu\sin\delta)^2$ from equation 81, equation 82 may be written as $$\frac{\sin^4\nu}{\omega^2}\left(\frac{d\psi}{dt}\right)^2 = \cos^2\delta\sin^2\nu - \frac{\sin^2\nu}{\omega^2}\left(\frac{d\nu}{dt}\right)^2 \quad (83)$$

Dividing through by $\sin^2\nu$, equation 83 is written as $$\sin^2\nu\left(\frac{d\psi}{dt}\right)^2 + \left(\frac{d\nu}{dt}\right)^2 = \omega^2\cos^2\delta \quad (84)$$

Solving equation 83 for cos δ, we have $$\cos\delta = \frac{1}{\omega}\left\{\sin^2\nu\left(\frac{d\psi}{dt}\right)^2 + \left(\frac{d\nu}{dt}\right)^2\right\}^{\frac{1}{2}} \quad (85)$$

which yields the angle of inclination δ in terms of the earth's rate of rotation ω about its polar axis, the azimuth angle ψ and the zenith angle ν.

Although the device of the present invention, as heretofore described, relates to the tracking of stars, it may be adapted to track the sun, by the use of filters, or any other celestial body.

The device of the present invention tracks a celestial body to determine the longitude and latitude of the present invention. In determining longitude and latitude, a celestial body, having a known Right Ascension, is periodically tracked so that the change in the zenith and azimuth angle of the celestial body can be measured.

I claim:

1. A navigational system responsive to light from a celestial body for providing outputs corresponding to longitude and latitude, comprising a telescope arranged to transmit an image of the celestial body, means connected to the telescope for driving the telescope so as to track the celestial body, a measuring circuit connected to the driving means for providing measurement signals corresponding to the zenith angle and the azimuth angle of the celestial body, signal means connected to the measuring circuit for providing signals corresponding to the rate of change of the azimuth angle and to the rate of change of the zenith angle in accordance with the signals from the measuring circuit, and means connected to the signal means for providing the longitude and latitude outputs in accordance with the signals from the signal means.

2. A navigational system of the kind described in claim 1 in which the output means includes means for providing a signal corresponding to Greenwich Sidereal Time G.S.T., means for providing a signal corresponding to the Right Ascension R.A. of the celestial body, means for providing a signal corresponding to the angle $\delta$ of declination of the celestial body, and computing means connected to the signal means, to the Greenwich Sidereal Time signal means, to the Right Ascension signal means and to the declination angle signal means for providing the outputs in accordance with the following equations:

$$\frac{d\psi}{dt} = \frac{(\sin \lambda - \cos \lambda \cos \phi \tan \delta)\omega}{(\cos \phi \sin \lambda - \cos \lambda \tan \delta)^2 + \sin^2 \phi}$$

$$\frac{d\nu}{dt} = \frac{\sin \phi \cos \delta \cos \lambda}{\sin \nu}$$

and East Longitude = R.A. − G.S.T. + $\Phi$; where $\lambda$ is the latitude angle, $\Phi$ is the hour angle and $d\psi/dt$ is the rate of change of the azimuth angle, and $d\nu/dt$ is the rate of change of the zenith angle.

3. A navigational system of the kind described in claim 2 in which the declination angle means includes two registers connected in series to the measuring circuit so that the registers store successive zenith angle measurement signals, a pulse source connected to the registers and providing an 'enter' pulse train to the register connected to the measurement circuit for entering the measurement signal in that register periodically and a 'shift' pulse train for shifting the contents of the registers periodically, an adder connected to the registers and providing a signal corresponding to the sum of the contents of the registers, and means connected to the adder for dividing the signal from the adder in half to provide a signal corresponding to the average zenith angle; and the computing means computes the angle $\delta$ of declination in accordance with the equation $$\cos \nu = \cos \lambda \cos \Phi \cos \delta + \sin \lambda \sin \delta$$ where $\nu$ is the average zenith angle.

4. A navigational system of the kind described in claim 1 in which the telescope is controlled to periodically track the celestial body and each tracking of the celestial body occurs after the lapse of a predetermined time interval.

5. A navigational system of the kind described in claim 4 in which the signal means includes means connected to the measuring circuit for storing successive zenith angle measurement signals, subtracting means connected to the storing means for determining the difference between two successive zenith angle measurement signals to provide a signal corresponding to the rate of change of the zenith angle of the celestial body, the azimuth angle measurement signal corresponds to the rate of change of the azimuth angle, and means for delaying the azimuth angle measurement signal so that the average zenith angle signal, the rate of change of the zenith angle signal and the rate of change of the azimuth angle signal are for the same time period.

6. A navigational system of the kind described in claim 5 in which the storing means includes two registers connected to the pulse source and one register connecting the other register to the up-down counter and the register connected to the up-down counter is periodically controlled by pulses from the pulse source to enter the count from counter and the contents of both registers are shifted periodically by shift pulse trains from the pulse source so that the registers contain successive counts.

7. A navigational system of the kind described in claim 4 in which the telescope provides an image of the celestial body and the driving means includes means responsive to the image of the celestial body for providing signals corresponding to the displacement of the image from a reference point, control means connected to the telescope and to the displacement signal means for periodically moving the telescope in response to the displacement signals so as to align the image of the celestial body with the reference point.

8. A navigational system of the kind described in claim 7 in which the control means includes means for providing a pulse train, means connected to the telescope for changing the position of the telescope in accordance with the displacement signals, switching means connected to the displacement signal means, to the pulse train means and to the positioning means for passing the displacement signals to the positioning means in response to the pulses in the pulse train and blocking the displacement signals during the absence of pulses in the pulse train.

9. A navigational system of the kind described in claim 7 in which the displacement signal means includes an image-dissector tube having a photocathode surface and arranged with the telescope so as to provide a signal when the image from the telescope is displaced on the photocathode surface of the image-dissector tube from the center of the photocathode surface in one sense and when the image on the photocathode surface is displaced from the center of the photocathode surface in another sense having a 90° spatial relationship to the first sense, and interpreting means connected to the image-dissector tube for providing the displacement signals in accordance with the signal from the image-dissector tube.

10. A navigational system of the kind described in claim 9 in which the control means includes means connected to the telescope for moving the telescope about a vertical axis in response to one displacement signal, means connected to the telescope for moving the telescope about a horizontal axis in response to the other displacement signal, means for providing a pulse train, and switching means connected to the horizontal axis moving means, to the vertical axis moving means, to the interpreting means and to the pulse train means for passing the one displacement signal to the vertical axis moving means and the other displacement signal to the horizontal axis moving means in response to the pulses of the pulse train and blocking the displacement signals during the absence of pulses of the pulse train.

11. A navigational system of the kind described in claim 7 in which the image of the celestial body is realigned with the reference point by moving the telescope and the measuring circuit includes means connected to the telescope for providing pulse trains in which each pulse and each interval between pulses correspond to a predetermined angular movement of the telescope, inverting means connected to the pulse train means, and counting means connected to the pulse train means and to the inverting means for counting the pulses and intervals between pulses to provide signals corresponding to the angular displacement of the telescope.

12. A navigational system of the kind described in claim 11 in which the pulse train means includes two encoders, one encoder arranged with the telescope to provide a pulse train corresponding to the angular movement of the telescope about its vertical axis and the other encoder arranged with the telescope to provide another pulse train corresponding to the angular movement of the telescope about its horizontal axis; the inverting means includes two inverters, each inverter being connected to a different encoder; and the counting means includes an up-down counter connected to the other encoder and to the inverter connected to the other encoder and providing a measurement signal corresponding to its count, a comparator connected to up-down counter, to a ground reference and to the displacement signal means compares a displacement signal corresponding to movement of the telescope about its horizontal axis with the ground reference and provides a signal corresponding thereto to the up-down counter to control the counting of direction of the up-down counter so that the count in the up-down counter corresponds to the zenith angle of the celestial body, a pulse source providing a pulse prior to each realignment of the telescope with the celestial body, and a counter connected to the pulse source, the one encoder and to the inverter connected to the one encoder so that the pulse from the pulse source periodically clear the second mentioned counter resulting in the count in the second mentioned counter corresponding to the change in azimuth angle of the celestial body and providing another measurement signal corresponding to its count.

13. A method for determining present longitude and latitude, comprising tracking a known celestial body, measuring the rate of change of the zenith angle and the rate of change of the azimuth angle of the celestial body and providing signals corresponding thereto, providing a signal corresponding to the angle of declination of the celestial body, providing a signal corresponding to Greenwich Sidereal Time, providing a signal corresponding to the Right Ascension of the celestial body, and computing the present longitude and latitude in accordance with measurement signals, the Right Ascension signal and the Greenwich Sidereal Time signal.

14. A method of the kind described in claim 13 in which the computing is done in accordance with the following equation:

$$\frac{d\psi}{dt} = \frac{(\sin \lambda - \cos \lambda \cos \phi \tan \delta)\omega}{(\cos \phi \sin \lambda - \cos \lambda \tan \delta)^2 + \sin^2 \phi}$$

$$\frac{d\nu}{dt} = \frac{\omega \sin \phi \cos \delta \cos \lambda}{\sin \nu}$$

and

East Longitude = R.A. $-$ G.S.T. $+ \Phi$; where $\lambda$ is the latitude angle, $\Phi$ is the hour angle, $\delta$ is the angle of declination of the celestial body, $d\psi/dt$ is the rate of change of the azimuth angle of the celestial body, $d\nu/dt$ is the rate of change of the zenith angle of the celestial body, $\omega$ is the rotational speed of the earth about its polar axis, R.A. is the Right Ascension of the celestial body, and G.S.T. is Greenwich Sidereal Time.